May 7, 1929.  C. C. FARMER  1,711,779
FLUID PRESSURE BRAKE
Filed Feb. 16, 1927
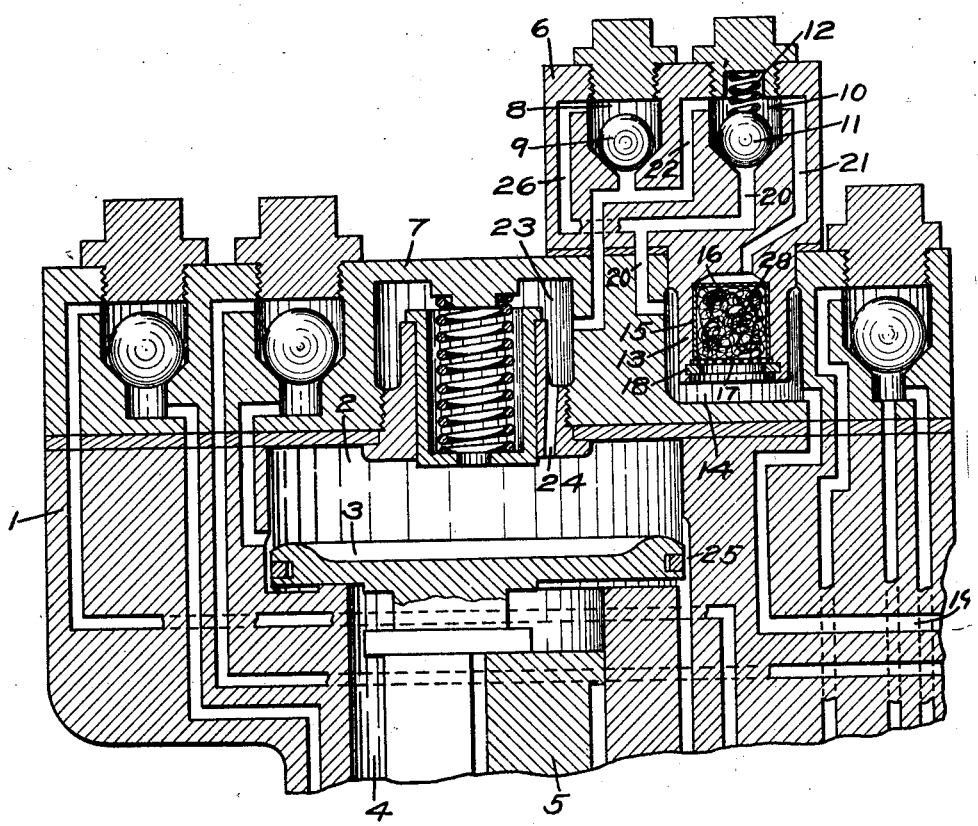
INVENTOR
CLYDE C. FARMER.
BY *Wm. N. Cady*
ATTORNEY Patented May 7, 1929.

1,711,779

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed February 16, 1927. Serial No. 168,628.

This invention relates to fluid pressure operated valve devices, and more particularly to valve devices such as are employed in fluid pressure brake systems for controlling the brakes.

On a fluid pressure brake system, a valve device is employed which is subject to brake pipe pressure and which is operated by variations in brake pipe pressure for controlling the application and release of the brakes.

If fluid under pressure supplied to a valve device, of the above character should contain foreign matter, such foreign matter will pass with the fluid to the working parts of the valve device, where it may accumulate, and then cause sluggish operation of the valve device, or it may even result in failure of the valve device to operate.

The principal object of my invention is to provide means for freeing the fluid under pressure supplied to a valve device of foreign matter.

On the accompanying drawing, the single figure is a sectional view of a portion of a valve device, showing my improvement applied thereto.

The valve device shown in the drawing is of the type employed in connection with a fluid pressure brake equipment and comprises a casing 1, having a piston chamber 2, containing a piston 3, and a valve chamber 4, containing a slide valve 5, adapted to be operated by piston 3. The open end of the piston chamber 2 is covered by a cap section 7.

The usual brake pipe is connected to a passage 19 in the casing 1 and from passage 19 fluid under pressure is supplied to the piston chamber 2. Passage 19 opens into a chamber 14 in the cap section 7 and extending into said chamber is a hollow cylindrical portion 13 of a casing member 6. A perforated disk 16 is mounted at the upper end of chamber within the portion 13 and is held in place by a rust proof bushing 15. The space within the bushing 15 is filled with oil filled curled hair 28 which is held in place by a perforated disk 17, said disk being held in place by means of a snap or spring ring 18.

A passage 21 leads from the curled hair chamber to chamber 10, containing a ball check valve 11 subject to the pressure of a coil spring 12 and a passage 20 leads from chamber 14 to the under side of check valve 11. A passage 26 leads from passage 20 to a chamber 8 containing a ball check valve 9, and a passage 22 connects valve chamber 10 with piston chamber 2, said passage also opening to the under side of check valve 9.

In operation, when the brake pipe is charged with fluid under pressure, fluid from the brake pipe flows through passage 19 to chamber 14 and thence through the curled hair 28 to passage 21, the curled hair operating to free the fluid from foreign matter, and from passage 21, the purified fluid flows to chamber 10 and thence through passage 22 to chamber 23 and through passage 24 to piston chamber 2.

If the curled hair 28 should become so clogged with foreign matter as to offer substantial resistance to the flow of fluid, then the pressure of fluid in chamber 14 and acting by flow through passage 20 on the seated face of the ball check valve 11 will exceed the combined pressures of fluid supplied through the curled hair 28 to passage 21 and that of spring 12, so that the check valve 11 will be lifted from its seat and will then permit flow of fluid from the brake pipe by way of passage 20, past the check valve 11 to passage 22 and thence to piston chamber 2.

When the brake pipe pressure is reduced to effect an application of the brakes, fluid under pressure from piston chamber 2 normally flows back to the brake pipe by way of passage 22, valve chamber 10, passage 21, through the curled hair 28, and thence through passage 19 to the brake pipe.

If, however, the curled hair 28 becomes clogged, so as to materially interfere with the flow of fluid, then the higher pressure of fluid flowing from piston chamber 2 to passage 22 will operate to unseat the check valve 9 against the lower pressure in the brake pipe which acts in chamber 8, and consequently fluid will be vented past the check valve 9 through passage 26, passage 20, chamber 14, and passage 19, to the brake pipe.

It will thus be seen that normally the fluid under pressure as supplied to or vented from the valve device is freed from foreign matter by flow through the curled hair 28, but in either case, should the curled hair become clogged, the flow of fluid will not be interfered with to an extent which would prevent the desired operation of the valve device.

The curled hair 28 is saturated with oil so as to arrest the passage of very fine particles of matter through the strainer. Fluid often contains particles so fine that they will remain in suspension in the air for a considerable period of time and such particles might pass through an ordinary curled hair strainer and thus reach the working parts of the valve device.

For this reason, it has heretofore been found undesirable to oil the piston and packing ring of a valve device, since the oil tends to collect the fine particles of matter and thus form a gummy coating on the piston which tends to cause the piston to stick in the piston cylinder. If the fine particles are removed from the fluid, as is done with the use of my improvement, then the piston may be oiled, so that wear between the piston packing rings and the piston cylinder will be greatly reduced.

By installing the fluid purifying means in the cylinder cap, it is only necessary to replace an ordinary cylinder cap with a cap provided with the fluid purifying means, in order to equip old valve devices with my improvement.

It will be noted that passage 19 enters the chamber 14 at a point such that the flow of fluid from said passage is directed across the floor of said chamber. As a consequence, the heavier particles of matter and water tend to collect on the floor, without entering the strainer. The particles of matter remain there, while the water or liquid which may collect, tends to drain back through the passage 19.

Having now described my invention, what I claim as new and desire to secure by Letters Patent, is:—

1. The combination with a fluid pressure device having a chamber and provided with a passage through which fluid under pressure is supplied to said chamber, of means for normally freeing fluid flowing from said passage to said chamber of foreign matter, and a check valve controlling a by-pass passage around said means, and operated upon clogging of said means with foreign matter to permit flow of fluid through the by-pass passage to said chamber.

2. The combination with a fluid pressure device having a chamber and provided with a passage through which fluid under pressure is vented from said chamber, of means for normally freeing fluid flowing from said chamber of foreign matter, and a check valve controlling a by-pass around said means and operated upon clogging of said means with foreign matter to permit flow of fluid from said chamber, through said by-pass passage.

3. The combination with a fluid pressure device having a chamber and provided with a main passage through which fluid under pressure is supplied to and released from said chamber, of means for freeing the fluid passing through said passage of foreign matter, a check valve in a by-pass passage around said means permitting flow of fluid through said main passage to said chamber, and a second check valve in a by-pass passage around said means permitting flow of fluid from said chamber to said main passage.

4. The combination with a fluid pressure device having a chamber and provided with a passage through which fluid under pressure is supplied to said chamber, of means for normally freeing fluid flowing from said passage to said chamber of foreign matter, a spring, and a check valve subject to the pressure of said spring and adapted to control a by-pass passage around said means.

5. The combination with a fluid pressure device comprising a body having a main chamber, of a cover plate applied to said body and having a chamber containing strainer material for straining fluid flowing to said main chamber.

6. The combination with a fluid pressure device comprising a body having a main chamber, of a cap plate for said chamber having a chamber containing filter material for freeing fluid flowing to said main chamber of foreign matter.

7. The combination with a fluid pressure device having a main chamber and a passage through which fluid is supplied to said chamber, of fluid straining means disposed in a chamber in the path of flow of fluid from said passage to said main chamber, said passage opening into said strainer chamber so that the flow of fluid from said passage is directed across said strainer chamber.

8. The combination with a fluid pressure device having a main chamber and a passage through which fluid is supplied to said chamber, of fluid straining means disposed in a chamber in the path of flow of fluid from said passage to said main chamber, said passage opening into said strainer chamber so that the flow of fluid from said passage is directed parallel to the floor of said strainer chamber.

In testimony whereof I have hereunto set my hand.

CLYDE C. FARMER.